United States Patent
Mitchell et al.

(10) Patent No.: US 9,762,726 B2
(45) Date of Patent: Sep. 12, 2017

(54) CONTACT CENTER AGENT DISPLAY APPLICATION

(75) Inventors: Robert Mitchell, Aberdeen, NJ (US); William Jolicoeur, Cary, NC (US); Joseph M. Wallerius, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 404 days.

(21) Appl. No.: 13/549,897

(22) Filed: Jul. 16, 2012

(65) Prior Publication Data
US 2014/0016770 A1    Jan. 16, 2014

(51) Int. Cl.
*H04M 3/22* (2006.01)
*H04M 3/00* (2006.01)
*H04M 3/51* (2006.01)
*H04M 3/42* (2006.01)

(52) U.S. Cl.
CPC ........... *H04M 3/00* (2013.01); *H04M 3/5175* (2013.01); *H04M 3/42178* (2013.01); *H04M 2201/38* (2013.01)

(58) Field of Classification Search
CPC .... G06F 21/32; G06F 21/84; H04M 1/42563; H04M 1/72577; H04M 2250/12
USPC ............ 379/265.02, 265.03, 265.06, 265.07; 348/78
See application file for complete search history.

(56) References Cited

U.S. PATENT DOCUMENTS

| | | | |
|---|---|---|---|
| 5,392,345 A * | 2/1995 | Otto ........................ | 379/266.09 |
| 5,742,675 A * | 4/1998 | Kilander et al. ......... | 379/266.09 |
| 5,946,375 A * | 8/1999 | Pattison et al. .......... | 379/112.01 |
| 6,049,602 A * | 4/2000 | Foladare et al. ......... | 379/265.04 |
| 6,144,971 A | 11/2000 | Sunderman et al. | |
| 6,392,666 B1 | 5/2002 | Hong et al. | |
| 6,466,663 B1 * | 10/2002 | Ravenscroft et al. ... | 379/265.01 |
| 6,782,087 B1 | 8/2004 | Atkinson et al. | |
| 2005/0100159 A1 | 5/2005 | Fink et al. | |
| 2006/0146990 A1 * | 7/2006 | Wagner et al. ............... | 379/67.1 |
| 2007/0061488 A1 * | 3/2007 | Alagappan et al. .......... | 709/246 |
| 2009/0048706 A1 * | 2/2009 | DeLine ........................ | 700/231 |
| 2012/0069986 A1 * | 3/2012 | Edholm et al. .......... | 379/265.06 |
| 2013/0208103 A1 * | 8/2013 | Sands et al. ..................... | 348/78 |
| 2014/0115466 A1 * | 4/2014 | Barak et al. ................... | 715/716 |

* cited by examiner

*Primary Examiner* — Ahmad F Matar
*Assistant Examiner* — Jirapon Intavong
(74) *Attorney, Agent, or Firm* — Sheridan Ross P.C.

(57) ABSTRACT

The system and method detect a communication device being connected to a network. It is determined if the communication device will be used by an Agent the contact center. If the communication device will be used by an Agent in the contact center, a contact center display application is downloaded onto the communication device. The contact center display application is used to display contact center status information. The contact center status information is transmitted to the communication device. The communication device receives the contact center status information and displays the contact center status information via the contact center display application that was downloaded onto the communication device.

20 Claims, 6 Drawing Sheets ical field

The system and method relates to contact centers and in particular to downloading contact center display applications.

BACKGROUND

Contact centers are able to gather a variety of statistics and contact center status information about an Agent. The statistics and contact center status information are used to track how efficiently the Agent is performing a particular task and what tasks the Agent is performing. Various elements of the statistics and contact center status information can be viewed by an Administrator or Supervisor of the contact center via their desktop. In addition, the Agent must keep track of their status with respect to how efficiently they are fitting into the call center, what the status is of various call center environmental factors, and the like.

A Supervisor in the contact center faces a similar problem. The Supervisor wants to have quick access to information about the contact center. This is not always the case. For example, as the Supervisor wanders through the contact center, the Supervisor does not have access to the same information when looking at an Agent's desktop. The Supervisor may not be able to tell what queue the Agent is currently servicing. To get the same status information, the Supervisor may have to talk to an Agent to get the status information. If the Agent is currently servicing a call from a customer, the Supervisor may have to wait until the call is completed to the get the Agent's current status. What is needed is a way for the Supervisor to easily determine an Agent's status is when walking around the contact center.

SUMMARY

The system and method are directed to solving these and other problems and disadvantages of the prior art. The system and method detect a communication device being connected to a network. It is determined if the communication device will be used by an Agent in the contact center. If the communication device will be used by the Agent in the contact center, a contact center display application is downloaded onto the communication device. The contact center display application is used to display contact center status information. The contact center status information is transmitted to the communication device. The communication device receives the contact center status information and displays the contact center status information via the contact center display application that was downloaded to the communication device.

In an alternative embodiment, the displayed contact center status information comprises status about an Agent that is using the communication device. The displayed contact center status information may be displayed in various ways such as an icon, a banner, a status indicator, and text. The contact center status information can be displayed as an icon that represents a ready to receive calls icon, a doing work after call icon, a logged in icon, a logged out icon, an on break icon, an at lunch icon, a queue icon, a manager icon, and a logout override icon.

In another alternative embodiment, the downloaded contact center display application may be a specific contact center display application based on an Agent that is using the communication device and/or based on a location of the Agent that is using the communication device. In addition, the downloaded contact center display application can be configured differently based on a role or group of the Agent that is using the communication device.

In yet another alternative, the downloaded contact center display application can be downloaded contingent on an event from an administration utility. For example, by an administrator selecting that the communication device will be used in the contact center. In one embodiment, the communication device is not a general purpose computer.

In another alternative, a Agent that is using the communication device is determined. Based on who the Agent is, the contact center display application is configured to display information specific to the Agent and to download information specific to the Agent.

In one alternative, downloading the contact center display application is based on at least one of an IP address, a MAC address, and a telephone number.

In another alternative, the downloaded contact center display application comprises a plurality of contact center display applications and the downloaded plurality of contact center display applications are downloaded based on more than one Agent using the communication device.

In still another alternative, the presence of a Supervisor is detected. In response to detecting the presence of the Supervisor, the displayed status information is modified.

In yet another alternative, the communication device consists of a device download module configured to receive the downloaded contact center display application. The contact center display application is downloaded onto the communication device based on a determination that the communication device will be used by an Agent in the contact center. A network interface is configured to receive contact center status information. A display in the communication device is configured to display the contact center display application and the contact center status information. The downloaded contact center display application may be a specific contact center display application based a functionality of the communication device.

DETAILED DESCRIPTION

Figure 1:
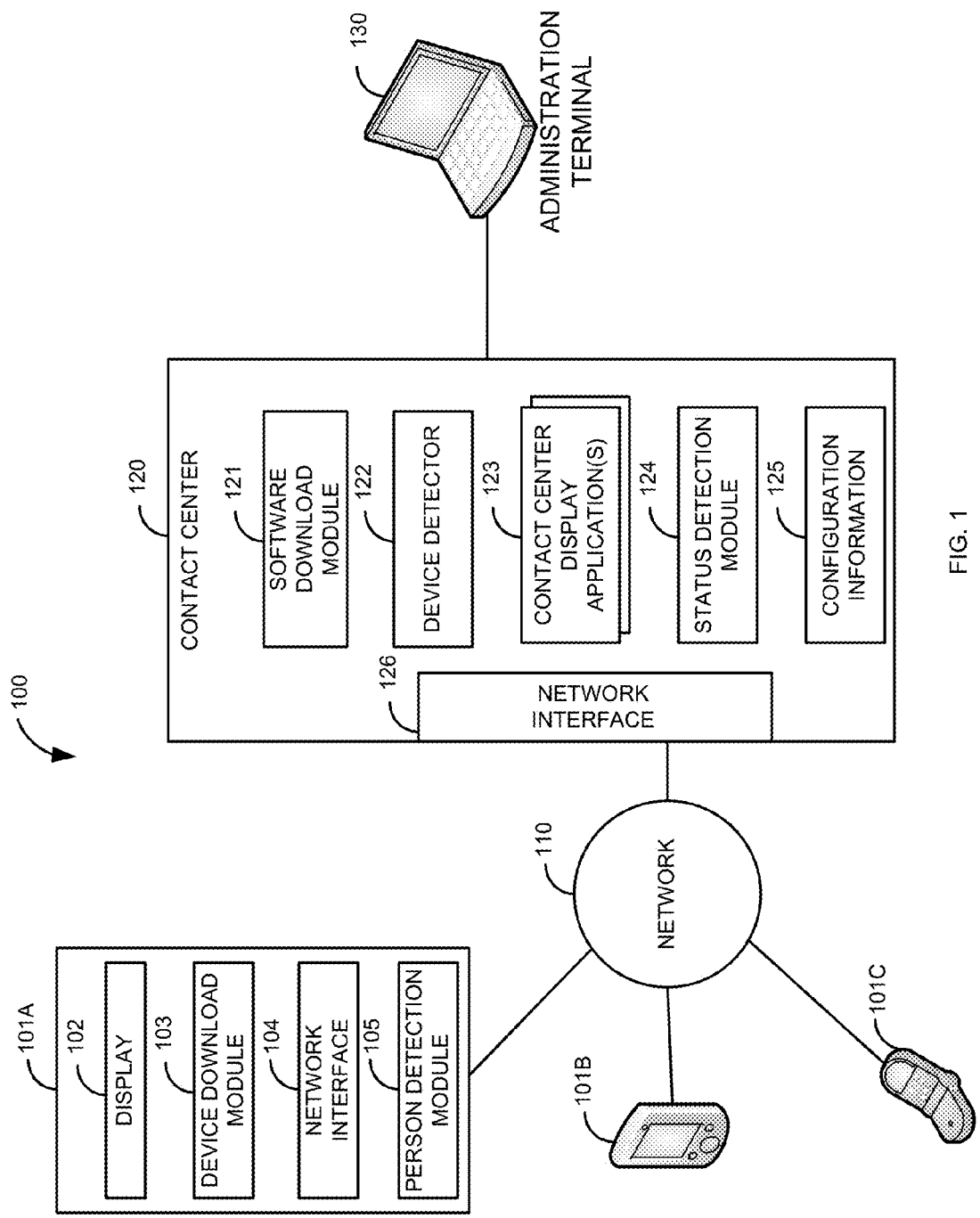
FIG. 1 is a block diagram of a first illustrative system for displaying status information in a communication device in a contact center.

FIG. 1 is a block diagram of a first illustrative system 100 for displaying status information in communication device 101 in a contact center 120. The first illustrative system 100 comprises communication devices 101A-101C, network 110, contact center 120, and administration terminal 130.

Communication devices 101A-101C can be any type of communication device such as a telephone, a cellular telephone, a tablet computer, an Agent terminal, a video terminal, a personal computer, a Personal Digital Assistant (PDA), a wired telephone, and the like. Communication device 101A comprises display 102, device download module 103, and network interface 104. Communication device 101, in some instances may not be a general purpose device such as a computer, but instead a dedicated device such as a telephone.

Display 102 can be any type of hardware/software that can display information such as a Liquid Crystal Display (LCD), a plasma display, a Cathode Ray Tube (CRT), a projection device, a Light Emitting Diode (LED) display, and the like. Device download module 103 can be any hardware/software that can download a contact center display application 123. Network interface 104 can be any hardware/software that can interface to network 110. For example, network interface 104 can be a wireless interface, a cellular interface, an Ethernet interface, a fiber optic interface, an 802.11 interface, an Integrated Services Digital Network (ISDN) interface, a T1 interface, a packet interface, a circuit switched interface, and the like.

Person detection module 105 can be any hardware/software that can detect the presence of the Agent and/or the Agent's Supervisor. For example, person detection module 105 can be a video camera on communication device 101 that can use facial recognition to detect the presence of the Agent and/or the Agent's Supervisor. Alternatively, person detection module 105 can detect the Agent and/or the Agent's Supervisor based on voice recognition, based on a calendar event where the Supervisor is going to walk around contact center 120, based on a calendar event where the Agent is in the contact center, based on the Agent logging into communication device 101, and/or the like. In addition, detection of the Supervisor can be based on wireless protocols such as Bluetooth, RFID, WiFi, and/or the like.

In addition to communication device 101A, the first illustrative system 100 is shown with two additional communication devices 101B-101C. However, the first illustrative system 100 can comprise any number of communication devices 101. For example, the first illustrative system may comprise only a single communication device 101A or more communication devices 101 than are shown (101A-101C) in FIG. 1. In addition, communication devices 101B-101C may or may not comprise various elements of display 102, device download module 103, and network interface 104. Communication devices 101A-101C are shown connecting to network 110. However, in other embodiments, communication devices 101A-101C can be directly connected to contact center 120.

Network 110 can be any network that can send and receive information, such as the Internet, a Wide Area Network (WAN), a Local Area Network (LAN), the Public Switched Communication Network (PSTN), a packet switched network, a circuit switched network, a cellular network, a combination of these, and the like. Network 110 can use a variety of protocols, such as Ethernet, Internet Protocol (IP), Session Initiation Protocol (SIP), Integrated Services Digital Network (ISDN), and the like.

Contact center 120 can be any hardware/software that can handle various contacts. For instance, contact center 120 can handle audio contacts, video contacts, Instant Message (1M) contacts, email contacts, text message contacts, various combinations of these, and the like. Contact center 120 further comprises software download module 121, device detector 122, contact center display application(s) 123, status detection module 124, configuration information 125, and network interface 126.

Software download module 121 can be any hardware/software that can download one or more contact center display applications 123 to communication device 101A. Device detector 122 can be any hardware/software that can detect the presence of one or more of communication devices 101. Device detector 122 can detect communication devices 101 in various ways. For example, device detector 122 can detect communication devices 101A-101C by sending a broadcast packet on network 110. In alternative embodiments, when communication devices 101A-101-C connect to network 110, communication devices 101A-101C can send out a message to contact center 120. Device detector 122 can detect communication devices 101A-101C in other ways such as when a connection or call is made from communication device 101A-101C to contact center 120.

Contact center display applications 123 can comprise various different contact center applications 123. For instance, a contact center display applications 123 can be unique to an individual Agent, specific to a specific group of Agents, based on a location of an Agent, based on a role of the Agent, based on a type of communication device 101, and/or the like. Contact center display application 123 can be customized for a specific Agent based on contact center status information or based on an administered configuration.

Status detection module 124 can be any hardware/software that can process various kinds of contact center status information such as, but not limited to detecting, reporting, sending, and/or manipulating contact center status information. Status detection module 124 can detect various kinds of contact center status information such as if an Agent is ready to receive a call, if the Agent is doing work after a call, if the Agent is logged in or out, if the Agent is on break or at lunch, if the Agent is assigned to a queue, who is the Agent's manager, if there has been a logout override (i.e., the manager has overridden the Agent's request to log out). Status detection module 124 can also send the contact center status information to communication devices 101A-101C.

Configuration information 125 can comprise various types of configuration information such as configuration information for contact center 120, configuration information for communication devices 101A-101C, configuration information for contact center display applications 123, administered configuration information, and the like. Configuration information 125 can be sent and downloaded to communication devices 101A-101C.

Network interface 126 can be any hardware/software that can interface to network 110. For example, network interface 126 can be a wireless interface, a cellular interface, an Ethernet interface, a fiber optic interface, an 802.11 interface, an Integrated Services Digital Network (ISDN) interface, a T1 interface, a packet interface, a circuit switched interface, and the like. Administration terminal 130 can be any hardware device that can be used to administer contact center 120. For instance, administration terminal 130 can be a Personal Computer (PC), a tablet device, a cellular telephone, a communication device 101, a terminal, and the like.

In the first illustrative system 100, contact center 120 is shown comprising a single entity. However, in other embodiments, individual elements of contact center 120 may be distributed across network 110. For example, device detector 122 may reside on a device such as a server within network 110. Likewise, software download module 121 can reside on a server separate from contact center 120.

In the following exemplary embodiment, the first illustrative system 100 is described using a single communication device 101A as an example. However, the same process will work for additional communication devices 101B-101C. Device detector 122 detects communication device 101A on network 110. Device detector 122 determines if communication device 101A will be used by an Agent in contact center 120. How device detector 122 determines if communication device 101A will be used by an Agent in contact center 120 can be accomplished in various ways. For example, device detector 122 can use an IP address, a MAC address, and/or a telephone number of an Agent or a telephone number of the communication device 101A to determine if communication device 101A will be used in contact center 120. Alternatively, device detector 122 can determine if communication device 101A will be used in contact center 120 based on a contingent event from an administration utility. For instance, if an administrator of contact center 120 selects that communication device 101A will be used in contact center 120 by the Agent. In still another alternative, device detector 122 can determine that the Agent is using communication device 101A by person detection module 105 detecting the presence of the Agent at communication device 101A via facial, recognition, voice recognition, Bluetooth, RFID, and/or the like.

How communication device 101 will be used in contact center 120 can be defined in various ways. For example, use by an Agent in contact center 120 can be specifically defined as communication device 101A being used only by an Agent of contact center 120. Use by an Agent in a contact center 120 may be defined based on other things such as an IP address, an IP address range, a defined telephone number, a telephone number range, a physical location, and/or the like.

In response to determining that communication device 101A will be used by an Agent in contact center 120, software download module 121 downloads contact center display application 123 to communication device 101A. Software download module 121 can download a specific contact center display application 123 based on a specific Agent that uses communication device 101A. Software download module 121 can download a different contact center display application 123 based on the location of an Agent that uses communication device 101A, a role of the Agent that uses communication device 101A, a group (e.g., an agent group that supports a specific company) of Agents that use communication device 101A, and the like. In a similar manner, instead of the download being based on the Agent, a specific contact center display application 123 can be downloaded based on other information that identifies an Agent such as a telephone number, an IP address, and/or a MAC address. In addition, software download module 121 can download multiple contact center display applications 123 based on various criteria.

Communication device 101A downloads contact center display application 123. In addition, communication device 101A can download multiple contact center display applications 123. For example, communication device 101A may be used by different Agents and different contact center display applications 123 are downloaded for each Agent that uses communication device 101A. If a first Agent logs on (e.g., using a password, voice recognition, and/or facial recognition) to communication device 101A, a first contact center display application 123 can be executed by communication device 101A. If a second Agent logs on to communication device 101A, a second contact center display application 123 can be executed by communication device 101A. For instance, if the first Agent supports audio contacts and the second Agent supports audio and email contacts, the downloaded first contact center display application 123 will be different from the second contact center display application 123.

Status detection module 124 detects various kinds of contact center status information. The contact center status information is sent via network interface 126 to communication device 101A. Network interface 104 receives the contact center status information. The contact center status information is displayed in display 102 via contact center display application 123 running in communication device 101A.

Figure 2:
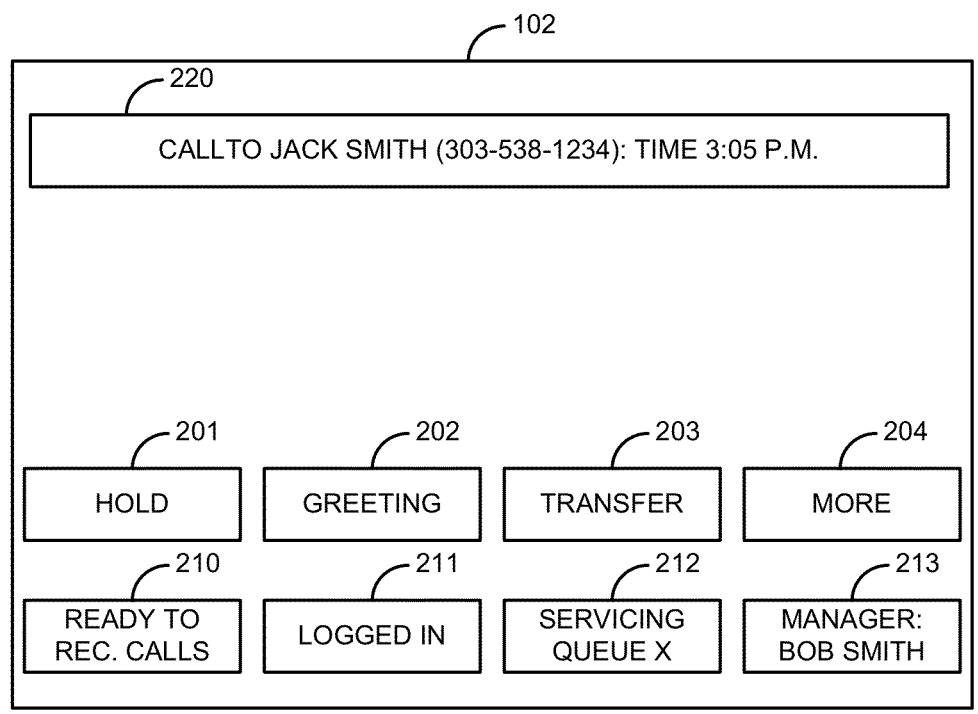
FIG. 2 is a diagram of a display showing an exemplary contact center display application.

FIG. 2 is a diagram of display 102 showing an exemplary contact center display application 123. In this illustrative example, display 102 is shown running contact center display application 123 that displays contact center status information. The advantage to displaying the various types of contact center status information on the Agent's communication device 101 via display 102 is that as a Supervisor walks around the contact center 120, the Supervisor can very quickly learn the Agent's current status. This way the Supervisor can monitor the Agent and not have to interrupt the Agent to get contact center status information.

The displayed elements in this illustrative example include banner 220, Agent buttons 201-204, and icons 210-213. The contact center status information that is displayed in display 102 can comprise various types of indicators such as icons 210-213, banner 220, a status indicator (e.g., icon 210), and text (in banner 220). The displayed status can include various types of information such as information about an Agent using communication device 101.

Banner 220 displays contact center status information that indicates that there is an active call to Jack Smith. Banner 220 also shows Jack Smith's telephone number and the current time. Banner 220 can be configured to display information specific to the Agent such as the Agent's name and/or specific information about the Agent. Agent buttons 201-204 can be used by the Agent in managing a contact such as placing the customer on hold (Agent button 201), playing a greeting to the customer (Agent button 202), transferring the customer to another Agent (Agent button 203), and displaying more options (button 204).

Icons 210-213 can also be used to display contact center status information. Ready to receive calls icon 210 is used to display that the Agent is ready to receive a call. Logged in icon 211 indicates whether the Agent is logged into contact center 120. Servicing queue icon 212 is used to indicate which contact center queue the Agent is servicing. Manager icon 213 is used to display the Agent's manager (Bob Smith). The Agent's current status can be easily determined by viewing contact center display application 123 in display 102.

In another embodiment, banner 220 and/or icons 210-123 can be modified based on detection of the Agent's Supervisor by person detection module 105. For example, as the Agent's Supervisor walks up behind the Agent, person detection module 105 can detect using facial and/or voice recognition that the Agent's Supervisor is present. Other types of process can be used to detect the Supervisor such as Bluetooth or RFID. For example, each of the Agent's communication devices 101 can be configured to monitor for the Bluetooth device of the Supervisor. This can be extended even further to have specific communication devices 101 configured to monitor for a list of Supervisor's Bluetooth signatures. Based on this detection, banner 220 and/or icons 210-213 can be modified in various ways such as enlarged, moved to a different part of display 102, rearranged in display 102, and the like. In addition, based on the Supervisor's presence, new icons may be displayed and/or icons 210-213 may be removed and/or highlighted. In yet another alternative, the text can be enlarged font or a different font based on the presence of the Supervisor.

In another embodiment, upon detection of the Supervisor, service observing warning tones can be generated and sent to the Agent's communication device 101. For example, service observing warning tones can be played when a call is being observed by the Supervisor. The Supervisor, using their own and independent communication device 101 can join/monitor an Agent's call, which will introduce the service warning tones that the Agent's Communication Device 101. Upon playing the service warning tones, communication device 101 can enter a supervisor display mode.

Figure 3:
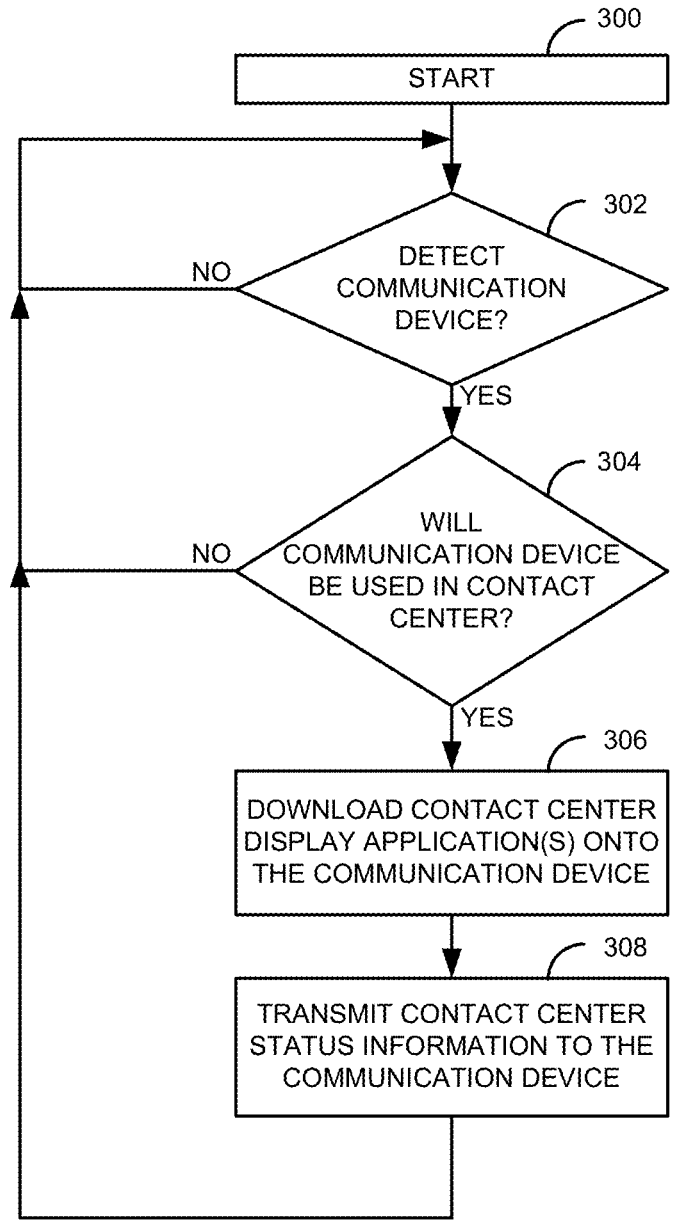
FIG. 3 is a flow diagram of a method for displaying status information in a communication device in a contact center.
Figure 4:
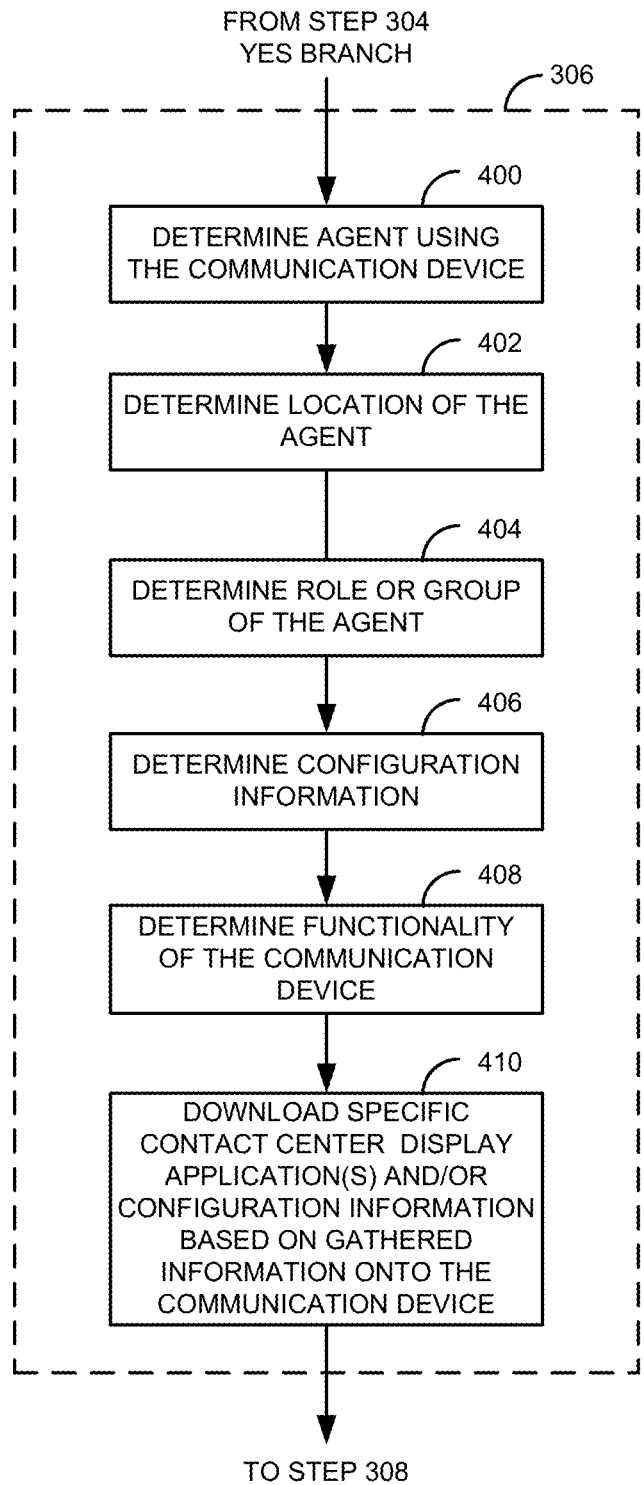
FIG. 4 is a flow diagram of a method for determining information about an Agent and the communication device in order to download and/or configure a contact center display application.
Figure 5:
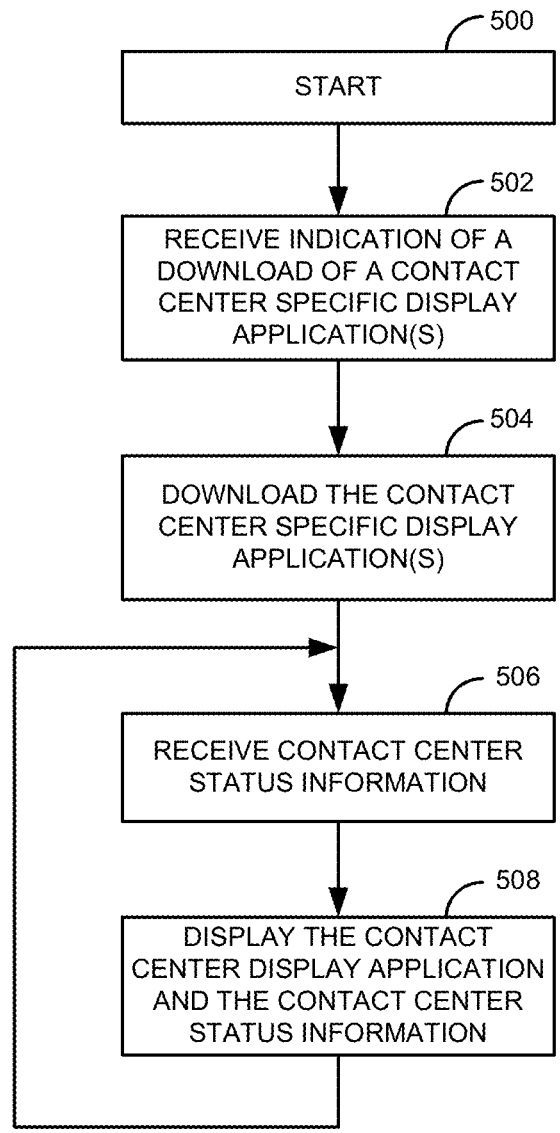
FIG. 5 is a flow diagram of a method for downloading a contact center display application onto a communication device.

FIG. 3 is a flow diagram of a method for displaying status information in a communication device 101 in a contact center 120. Illustratively, communication devices 101A-101C, display 102, device download module 103, network interface 104, person detection module 105, software download module 121, device detector 122, contact center display application(s) 123, status detection module 124, and network interface 126 are stored-program-controlled entities, such as a computer or processor, which performs the method of FIGS. 3-5 and the processes described herein by executing program instructions stored in a non-transient computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 300. The process determines if communication device 101 has been detected in step 302. If a communication device 101 has not been detected in step 302, step 302 is repeated. If communication device 101 has been detected in step 302, the process determines in step 304 if communication device 101 will be used by an Agent in contact center 120. If communication device 101 will not be used by the Agent in contact center 120, the process goes to step 302.

Otherwise, if communication device 101 will be used by the Agent in contact center 120 in step 304, the process downloads 306 one or more contact center display applications 123 to communication device 101. Contact center status information is transmitted 308 to communication device 101. The process goes to step 302.

Step 308 is shown as a step that occurs in series with the other steps of FIG. 4. However, step 308 may be implemented as a separate thread that can transmit contact center status information either periodically or based on a change in the contact center status information. For example, if an Agent logs out of contact center 120, the process would transmit 308 the change in Agent status from logged in to logged out.

FIG. 4 is a flow diagram of a method for determining information about an Agent and communication device 101 in order to download and/or configure contact center display application 123. The process described in FIG. 4 is an exemplary expanded view of step 306 in FIG. 3. After determining that the communication device 101 will be used by an Agent in contact center 120 in step 304, the process determines 400 which Agent is using communication device 101. How the process can determine which Agent is using communication device 101 can be accomplished in various ways. For instance, the Agent may be administered to use communication device 101. Alternatively, the Agent may login from communication device 101.

The process determines 402 the location of the Agent. The Agent's location can be determined in various ways such as using Global Positioning Satellite (GPS) in communication device 101, via an administration utility, by a connection to a wireless network, via cell phone triangulation, via RFID, and the like.

The process determines 404 a role or group of the Agent. The role of the Agent may vary based on different factors. For example, the role of an Agent may be to support a specific company, to support a specific type of customer (e.g., a customer who wants their call escalated), to support a specific product, and/or the like. A group of the Agent may be defined based on different factors as well. For instance, an administrator may define a group of Agents to support a specific product, specific product type, a specific company, and the like.

In step 406, the process determines configuration information 125. Configuration information 125 can be information that may be used by contact center display application 123. Configuration information 125 can include, but is not limited to information on what contact center status information to display in contact center display application 123, information about what Agents use communication device 101, information about what to display in banner 220, information about an Agent's Supervisor, and the like.

The process determines 408 the functionality of communication device 101. Functionality of communication device 101 may include information such as a display size, processing power, memory in communication device 101, a device version, a supported language, types of mediums supported (e.g., voice, video, text, etc.) and the like.

Based on the information gathered from steps 400-408, the process downloads 410 specific contact center display application(s) 123 and/or configuration information 125 to communication device 101. The process of determining which specific contact center display application(s) 123 to download can be accomplished in many ways. Below are just some of many examples that may be used.

If a specific Agent is using communication device 101, a different contact center display application 123 can be downloaded based on a role of the Agent or based on a specific group that the Agent is in. For instance, if the role of the Agent is to provide second tier support, the contact center display application 123 that is downloaded may have contact center status information displayed in an icon that represents a dissatisfaction level of the customer. On the other hand, if the Agent's role is to provide first tier support for new customers, the downloaded contact center display application 123 would not include the dissatisfaction icon.

In a similar manner, instead of downloading a different contact center display application 123, different configuration information 125 can be downloaded to communication device 101. For instance, using the above example, instead of downloading two applications, different configuration information 125 can be downloaded to communication device 101 to cause the contact center display application 123 to display different icons.

In yet another embodiment, a different contact center display application 123 can be downloaded based on a location of the Agent. For example, if the Agent is remote to contact center 120, the downloaded contact center display application 123 may include a security module to encrypt information sent from communication device 101; whereas if the Agent is not remote, the downloaded contact center display application 123 will not include the security module.

In yet other embodiments, by determining functionality such as screen size or device type, the contact center display application 123 can be configured to display more icons/contact center status information. Other examples may include downloading different contact center display applications 123/configuration information 125 based on factors such as different languages supported in the device. For instance, if the device supports Spanish, the downloaded contact center display application 123 may be a version localized for Spanish.

FIG. 5 is a flow diagram of a method for downloading a contact center display application 123 onto communication device 101. The process described in FIG. 5 is shown from communication device 101's perspective. The process starts in step 500. Communication device 101 receives 502 an indication of a download of a contact center display application(s) 123. The contact center display application(s) 123 are downloaded 504 to communication device 101.

Communication device 101 receives 506 the contact center status information. Communication device 101 displays 508 the contact center display application in display 102 along with the received contact center status information. The process then repeats steps 506 and 508 as new contact center status information is received.

Figure 6:
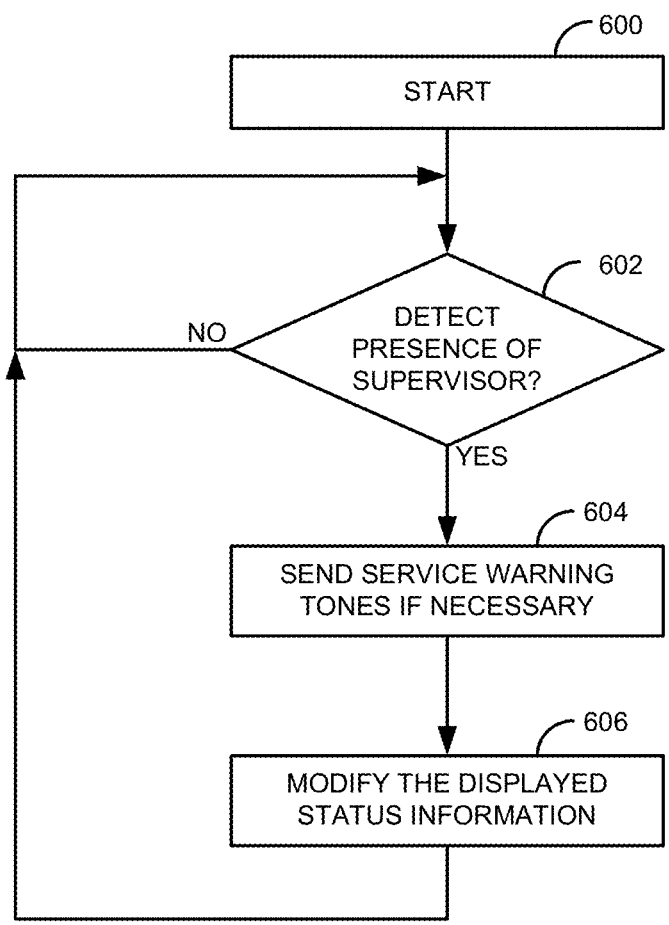
FIG. 6 is a flow diagram of a method for detecting the presence of a Supervisor.

FIG. 6 is a flow diagram of a method for detecting the presence of a Supervisor. The process described in FIG. 6 can be used in a contact center system and/or a peer-to-peer system. The process starts in step 600. The process waits in step 602 to detect the presence of a Supervisor at the Agent's communication device 101. If the Supervisor is not detected at communication device 101, the process repeats. Otherwise, if the Supervisor is detected in step 602, the process may send 604 service warning tones if necessary. The service warning tones can alert the agent of the presence of the Supervisor or that the supervisor has joined the call. The process modifies 604 the displayed status information and the process goes to step 602. The display status can be modified for example, based on the Supervisor joining the call.

The process can modify the displayed status information in various ways or not all based on different criteria. For example, the displayed icons 210-213 can be moved, resized, reordered, removed, added, and/or the like. Text can be displayed differently such as using different fonts, different font sizes, displayed differently in banner 220, and the like. In addition, various types of buttons or features can be added or removed. Banner 220 can be displayed in a different area or may be displayed only on appearance of the Supervisor. Icons 210-213, banner 220, and text can be reordered, moved, added, removed, and/or resized based on a specific Supervisor, based on a calendar event, based an email sent by a Supervisor, and/or the like.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention.

What is claimed is:

1. A method comprising:
   detecting, by one or more processors, a communication device being connected to a network;
   determining, by the one or more processors, that the communication device will be used by an agent in a contact center;
   in response to determining that the communication device will be used by the agent in the contact center, downloading, by the one or more processors, a contact center display application onto the communication device, wherein the contact center display application displays contact center status information;
   transmitting, by the one or more processors, the contact center status information to the communication device;
   detecting, by the one or more processors, a presence of a supervisor observing a call between the agent and a customer, wherein the supervisor observes the call at the communication device used by the agent; and
   in response to detecting the presence of the supervisor observing the call between the agent and the customer at the communication device used by the agent, modifying how the status information is displayed by changing a font or size of a font that is displayed to the agent and the supervisor.

2. The method of claim 1, wherein the displayed contact center status information comprises at least one of: an icon, a banner, a status indicator, and text.

3. The method of claim 2, wherein the displayed contact center status information is an icon and the displayed contact center status information comprises at least one of the following: a doing work after call icon, an on break icon, an at lunch icon, a manager icon, and a logout override icon.

4. The method of claim 1, wherein the downloaded contact center display application is a specific contact center display application based on a first media type supported by the agent that uses the communication device and wherein a second contact display application is downloaded based on a second media type supported by a second agent that uses the communication device.

5. The method of claim 1, wherein the downloaded contact center display application is configured differently based on a role or group of the agent that uses the communication device.

6. The method of claim 1, further comprising the steps of:
   determining the agent using the communication device; and
   configuring the contact center display application to display information specific to the agent or downloading information specific to the agent.

7. The method of claim 1, wherein in response to detecting the presence of the supervisor observing the call between the agent and the customer at the communication device used by the agent, sending warning tones to the communication device used by the agent, wherein the warning tones indicate the call is being observed by the supervisor, and in response to sending the warning tones, changing a display on the communication device used by the agent to a supervisory display mode.

8. The method of claim 1, wherein modifying how the status information is displayed is also based on the supervisor joining the call between the agent and the supervisor using the supervisor's own independent communication device.

9. The method of claim 1, wherein the status information displayed at the communication device used by the agent is further modified based on a calendar event of the supervisor, wherein the calendar event of the supervisor is that the supervisor is going to be walking around the contact center.

10. A system comprising:
- a device detector configured to detect a communication device being connected to a network and determine that the communication device will be used by an agent in a contact center;
- a software download module configured to download a contact center display application onto the communication device in response to determining that the communication device will be used by the agent in the contact center, wherein the contact center display application displays contact center status information;
- a network interface configured to transmit the contact center status information to the communication device;
- a person detection module configured to detect a presence of a supervisor observing a call between the agent and a customer, wherein the supervisor observes the call at the communication device used by the agent; and
- a status detection module configured to modify how the status information is displayed by changing a font or size of a font that is displayed to the agent and the supervisor in response to detecting the presence of the supervisor observing the call between the agent and the customer at the communication device used by the agent.

11. The system of claim 10, wherein the displayed contact center status information comprises at least one of: an icon, a banner, a status indicator, and text, and wherein the contact center status information comprises at least one of: a ready to receive calls icon, a doing work after call icon, a logged in icon, a logged out icon, and a logout override icon.

12. The system of claim 10, wherein the downloaded contact center display application is a specific contact center display application based on the agent that uses the communication device.

13. The system of claim 10, wherein the downloaded contact center display application is a specific contact center display application based on a location of the agent that uses the communication device.

14. The system of claim 10, wherein the downloaded contact center display application is configured differently based on a role or group of the agent that uses the communication device.

15. The system of claim 10, wherein downloading the contact center display application is based on at least one of an IP address, a MAC address, and a telephone number.

16. The system of claim 10, wherein the downloaded contact center display application comprises a plurality of contact center display applications and the downloaded plurality of contact center display applications are downloaded based on more than one agent using the communication device.

17. The system of claim 10, wherein the status information displayed at the communication device used by the agent is further modified based on a calendar event of the supervisor, wherein the calendar event of the supervisor is that the supervisor is going to be walking around the contact center.

18. A communication device of an agent comprising:
- a device download module configured to receive a contact center display application, wherein the contact center display application is downloaded onto the communication device based on a determination that the communication device will be used by an agent in a contact center;
- a network interface configured to receive contact center status information and receive modified status information based on detecting a presence of a supervisor observing a call between the agent and a customer, wherein the supervisor observes the call at the communication device;
- a display configured to display the contact center display application and the contact center status information and modify the contact center status information by changing a font or size of a font that is displayed to the agent and supervisor in response to the supervisor observing the call between the agent and the customer; and
- a person detection module configured to detect the presence of the supervisor observing the call between the agent and a customer at the communication device.

19. The communication device of claim 18, wherein the downloaded contact center display application is a specific contact center display application based a functionality of the communication device.

20. The communication device of claim 18, wherein the downloaded contact center display application is a specific contact center display application based on the agent that uses the communication device or based on a location of an agent that uses the communication device.

* * * * *